US012676846B2

(12) United States Patent (10) Patent No.: US 12,676,846 B2
Ryan et al. (45) Date of Patent: Jul. 7, 2026

(54) SYSTEMS AND METHODS FOR CENTRALIZED MANAGEMENT OF A PLURALITY OF CLOUD SERVICES OF A CLOUD-BASED SYSTEM

(71) Applicant: Zscaler, Inc., San Jose, CA (US)

(72) Inventors: Mark Ryan, London (GB); Pooja Deshmukh, San Fransisco, CA (US)

(73) Assignee: Zscaler, Inc., San Jose, CA (US)

( * ) Notice: Subject to any disclaimer, the term of this patent is extended or adjusted under 35 U.S.C. 154(b) by 177 days.

(21) Appl. No.: 18/419,433

(22) Filed: Jan. 22, 2024

(65) Prior Publication Data

US 2025/0240283 A1 Jul. 24, 2025

(51) Int. Cl.
*H04L 9/40* (2022.01)
*H04L 29/06* (2006.01)

(52) U.S. Cl.
CPC .................................. *H04L 63/083* (2013.01)

(58) Field of Classification Search
CPC .. H04L 63/083; H04L 63/0807; H04L 63/102
USPC .......................................................... 726/4
See application file for complete search history.

(56) References Cited

U.S. PATENT DOCUMENTS

| | | | |
|---|---|---|---|
| 11,455,407 B2 | 9/2022 | Zhang et al. | |
| 11,671,433 B2 | 6/2023 | Paul et al. | |
| 11,863,674 B2 | 1/2024 | Bayar et al. | |

| | | | | |
|---|---|---|---|---|
| 2017/0111475 | A1* | 4/2017 | Saheba | .................. H04L 63/102 |
| 2018/0007024 | A1* | 1/2018 | Ahmed | .................. H04L 63/062 |
| 2019/0132303 | A1* | 5/2019 | Kurian | ..................... H04L 63/08 |
| 2021/0336934 | A1 | 10/2021 | Deshmukh et al. | |
| 2022/0109696 | A1 | 4/2022 | Deshmukh et al. | |
| 2022/0116397 | A1 | 4/2022 | Deshmukh et al. | |
| 2022/0198055 | A1 | 6/2022 | Deshmukh | |
| 2022/0374599 | A1 | 11/2022 | Deshmukh et al. | |
| 2023/0018809 | A1 | 1/2023 | Deshmukh | |
| 2023/0019448 | A1 | 1/2023 | Deshmukh et al. | |
| 2023/0163967 | A1* | 5/2023 | Cannata, Jr. | .......... H04L 9/3263 713/156 |
| 2023/0179599 | A1* | 6/2023 | Swain | ..................... H04L 63/10 726/4 |
| 2023/0231884 | A1 | 7/2023 | Deshmukh et al. | |

OTHER PUBLICATIONS

User-centered security management of API-based data integration workflows, Suzic, Apr. 2016 (Year: 2016).*

* cited by examiner

*Primary Examiner* — Jahangir Kabir
(74) *Attorney, Agent, or Firm* — Baratta Law PLLC; Lawrence A. Baratta, Jr.; Ryan Odessa

(57) ABSTRACT

Systems and methods for managing a plurality of cloud services of a cloud-based system include receiving a request from a client associated with a cloud-based system, wherein the request is to perform one or more actions associated with the cloud-based system; determining if the client is allowed to perform the one or more actions based on a scope associated with the client; and routing the request to one or more services of the cloud-based system based on the determining. The systems can automatically determine the one or more services of the cloud-based system associated with the request; and route the request to the one or more services of the cloud-based system based thereon.

20 Claims, 10 Drawing Sheets

850

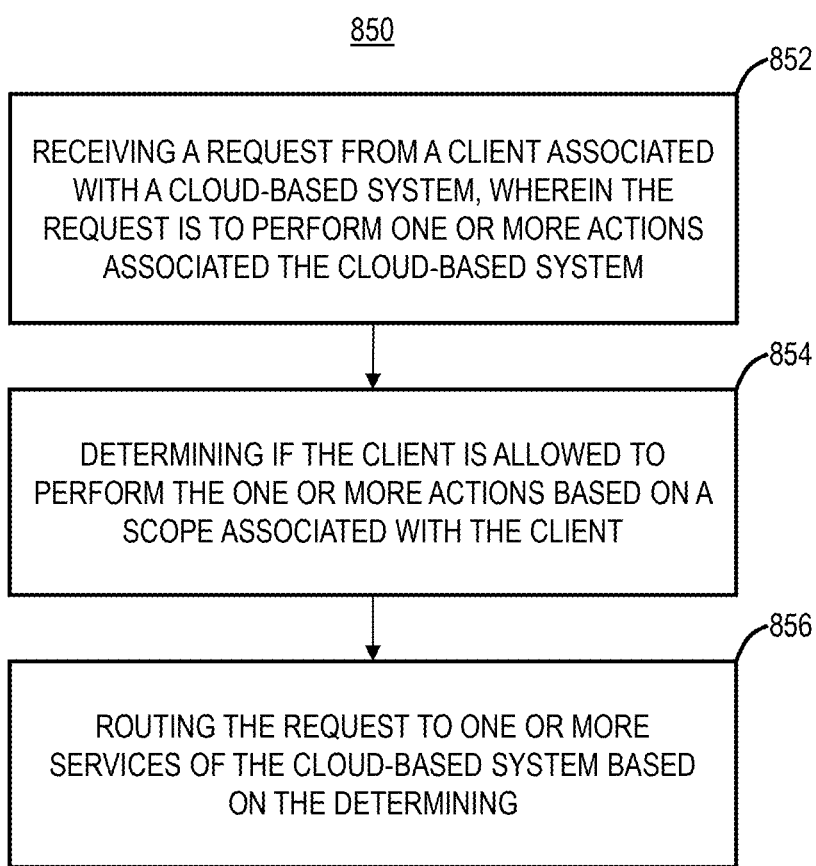

852

RECEIVING A REQUEST FROM A CLIENT ASSOCIATED WITH A CLOUD-BASED SYSTEM, WHEREIN THE REQUEST IS TO PERFORM ONE OR MORE ACTIONS ASSOCIATED THE CLOUD-BASED SYSTEM

854

DETERMINING IF THE CLIENT IS ALLOWED TO PERFORM THE ONE OR MORE ACTIONS BASED ON A SCOPE ASSOCIATED WITH THE CLIENT

856

ROUTING THE REQUEST TO ONE OR MORE SERVICES OF THE CLOUD-BASED SYSTEM BASED ON THE DETERMINING

FIG. 9

SYSTEMS AND METHODS FOR CENTRALIZED MANAGEMENT OF A PLURALITY OF CLOUD SERVICES OF A CLOUD-BASED SYSTEM

FIELD OF THE DISCLOSURE

The present disclosure relates generally to networking and computing. More particularly, the present disclosure relates to systems and methods for centralized management of a plurality of cloud services of a cloud-based system.

BACKGROUND OF THE DISCLOSURE

With the extent of different services provide via cloud-based systems, it is becoming an increasingly tedious task to configure and alter cloud environments through a Graphical User Interface (GUI). Different cloud based services, such as security services, each have unique programing interfaces to manage their platforms, have evolved independently of each other. Because of this, it becomes complex and inefficient to configure and make changes to cloud environments which utilize a plurality of these services. Clients calling unsupported Application Programming Interface (API) endpoints risk service issues if changes in the system occur. The present disclosure provides systems and methods for centrally managing a plurality of cloud services of a cloud-based system. The present systems and methods provide a single gateway which is adapted to ingest service requests and automatically distribute the requests to services with which they are associated, thereby removing the need for customers to manually interact with User Interfaces (UIs) of different services and greatly reducing overhead.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include receiving a request from a client associated with a cloud-based system, wherein the request is to perform one or more actions associated with the cloud-based system; determining if the client is allowed to perform the one or more actions based on a scope associated with the client; and routing the request to one or more services of the cloud-based system based on the determining.

The steps can further include automatically determining the one or more services of the cloud-based system associated with the request; and routing the request to the one or more services of the cloud-based system based thereon. The scope can indicate one or more actions which the client is allowed to perform on one or more services of the cloud-based system. The steps can further include registering the client to define the scope; and providing the client with a token, wherein the token is mapped to, and identifies the scope of the client. The steps can further include receiving the token with the request from the client; and determining, based on an identity of the client and the token, if the client is allowed to perform the one or more actions. Registering the client and providing the token can be performed at a common authorization module, and the routing can be performed at an API proxy, wherein the common authorization module and the API proxy are communicatively coupled. The API proxy can be adapted to, based on receiving a request with a token, consult the common authorization module for the determining. The request can be blocked based on the scope associated with the client.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 9 is a flow chart of a process for API cloud service management.

DETAILED DESCRIPTION OF THE DISCLOSURE

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
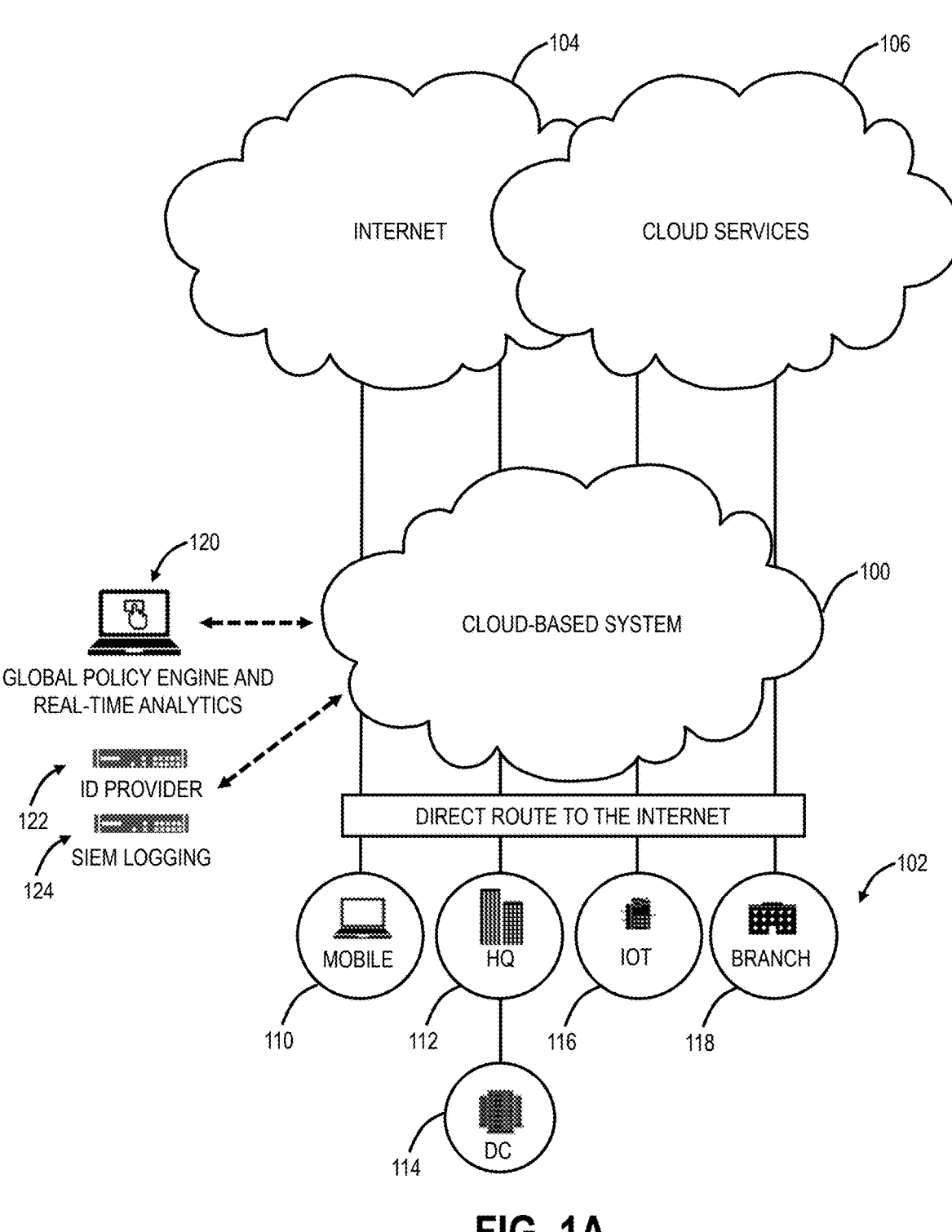
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
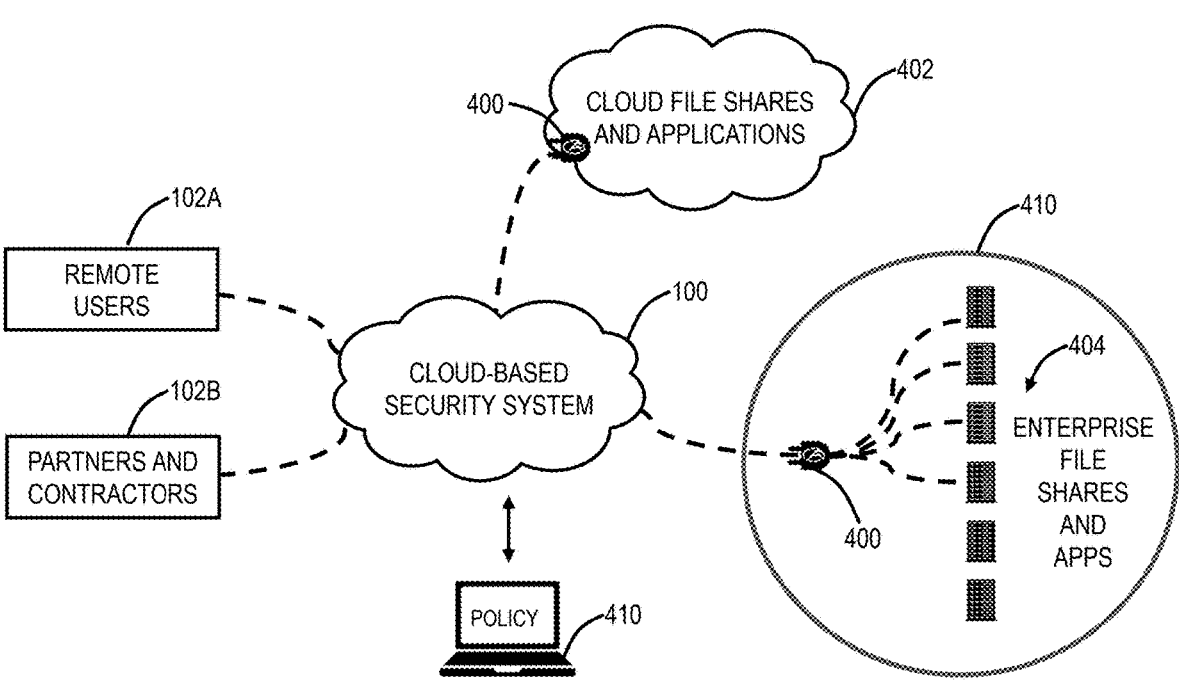
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
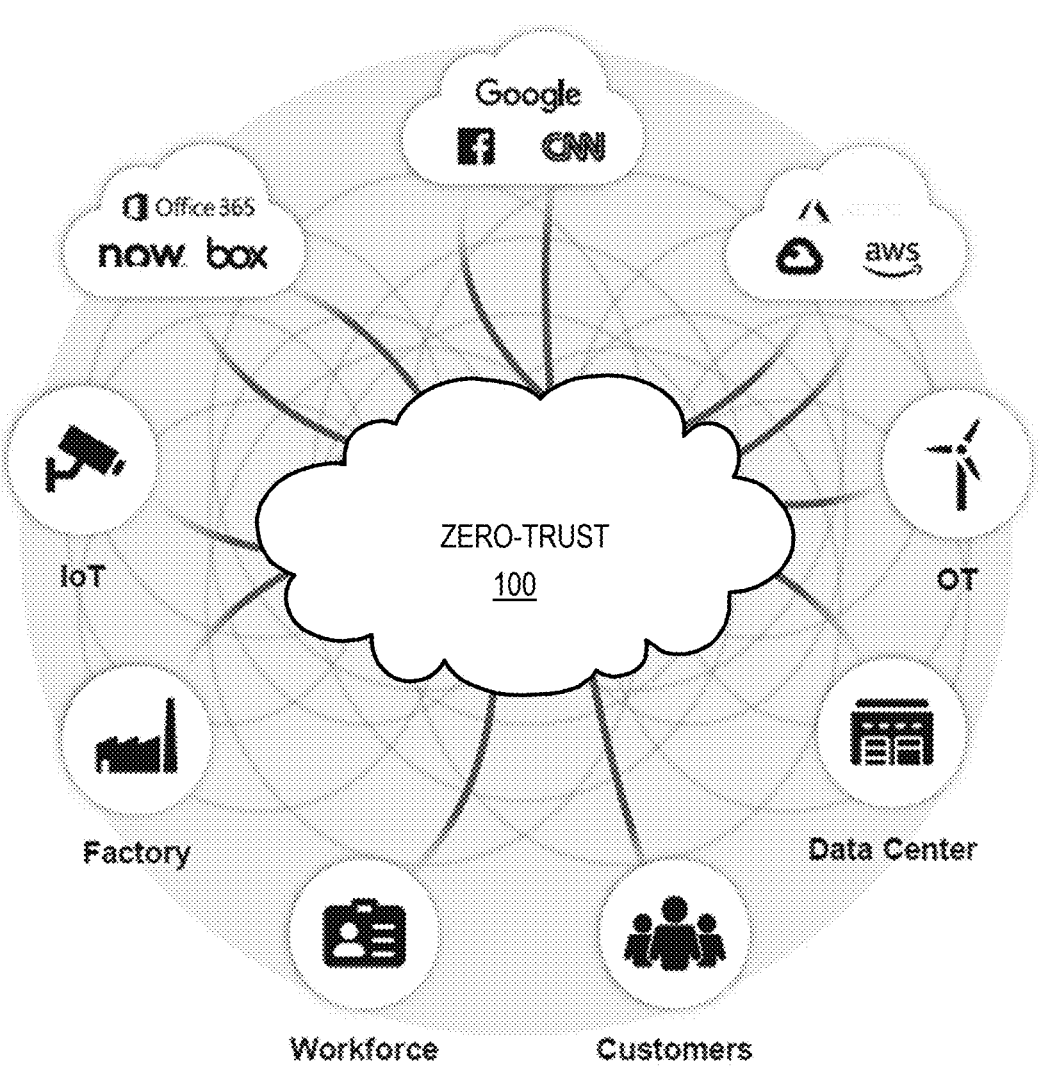
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
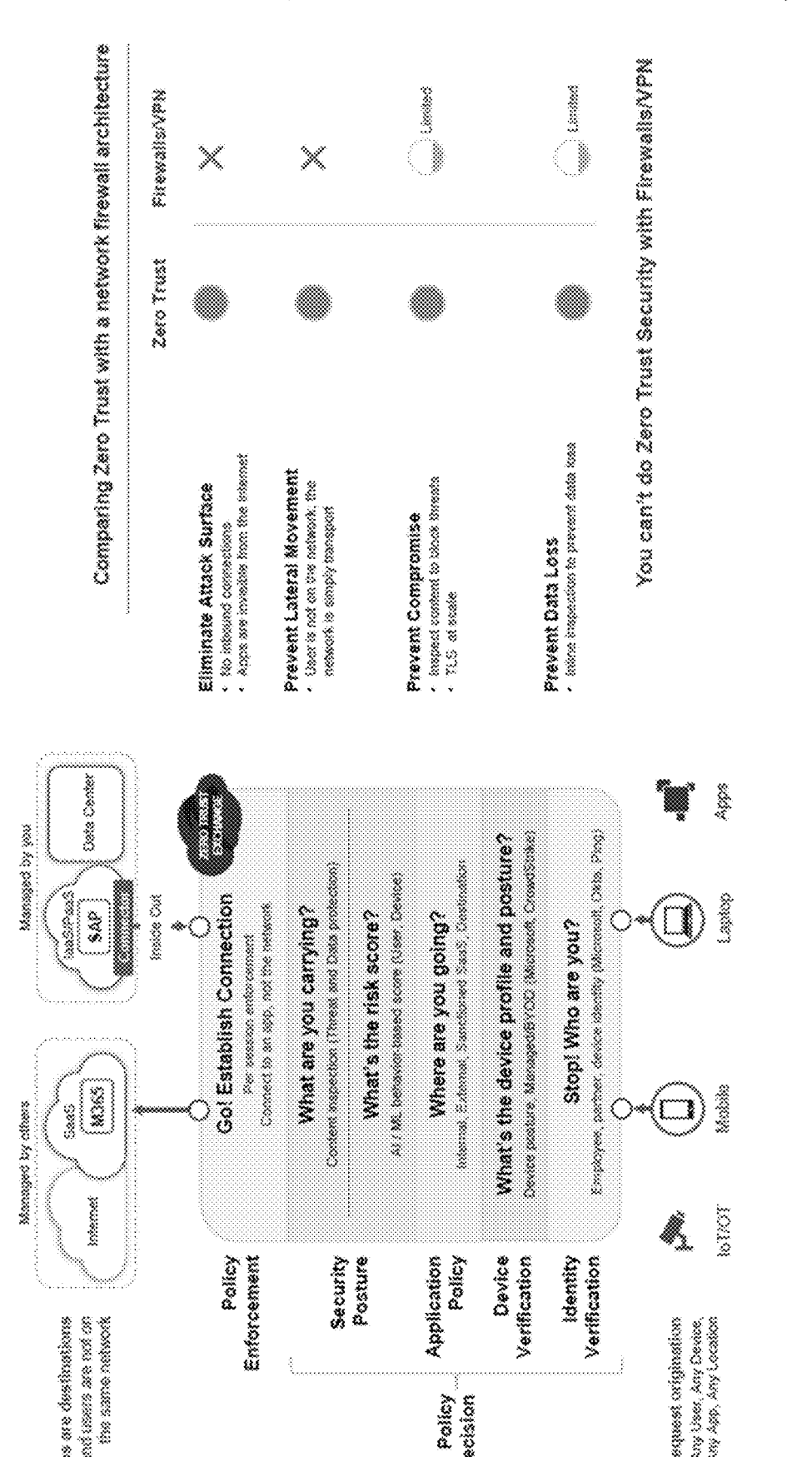
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
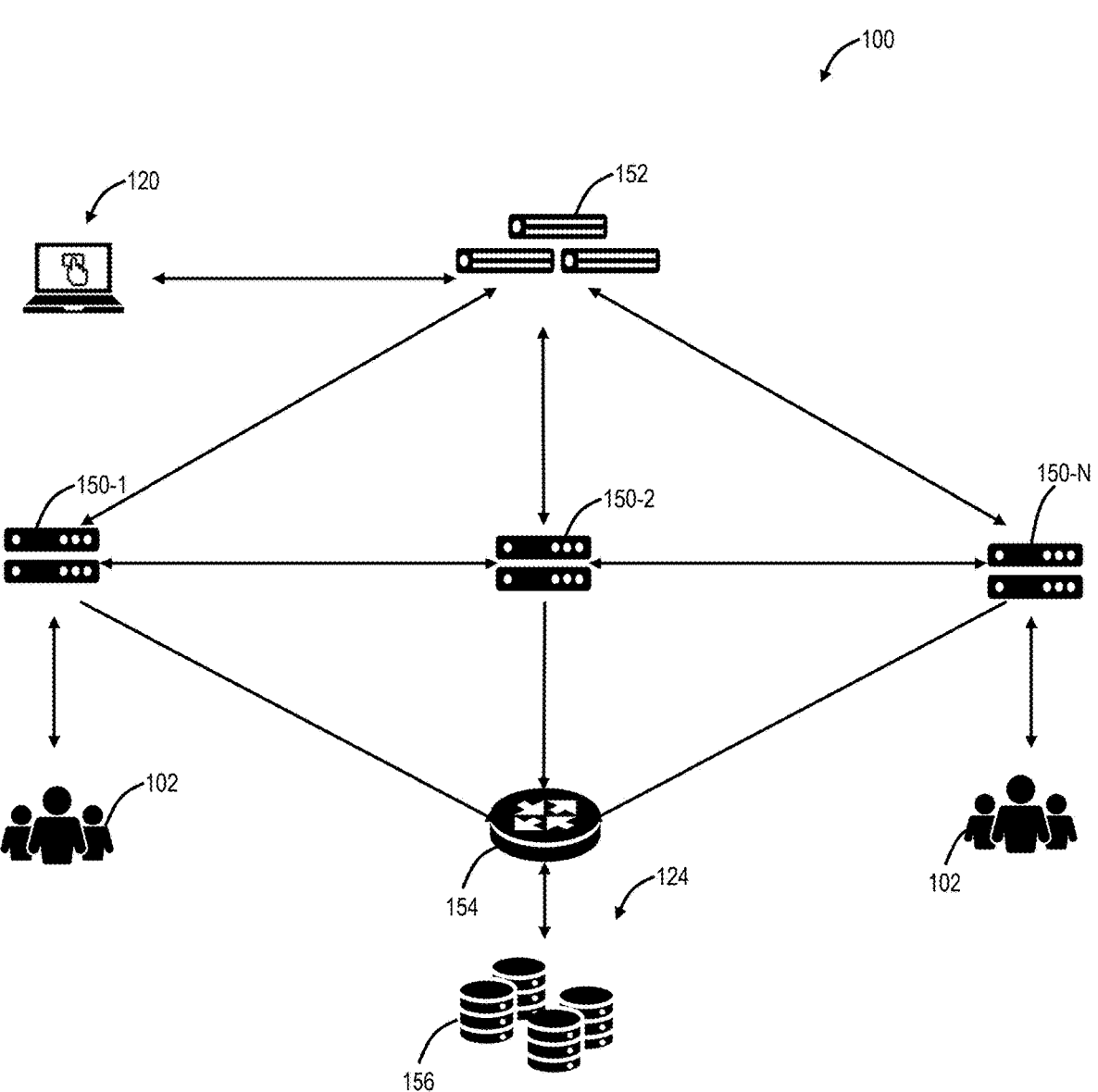
FIG. 2 is a network diagram of an example implementation of the cloud-based system.
Figure 4:
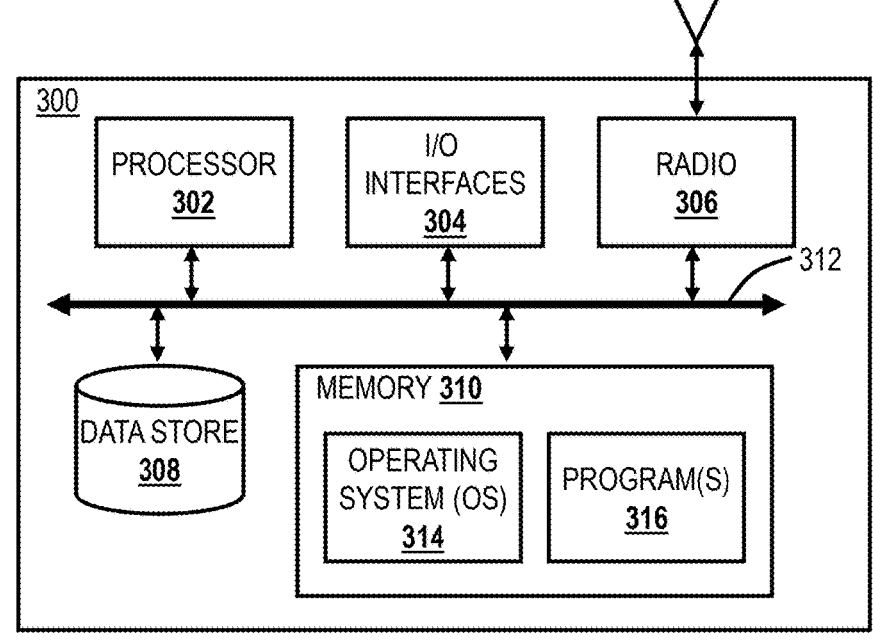

FIG. 2 is a network diagram of an example implementation of the cloud-based system 100. In an embodiment, the cloud-based system 100 includes a plurality of nodes (EN) 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
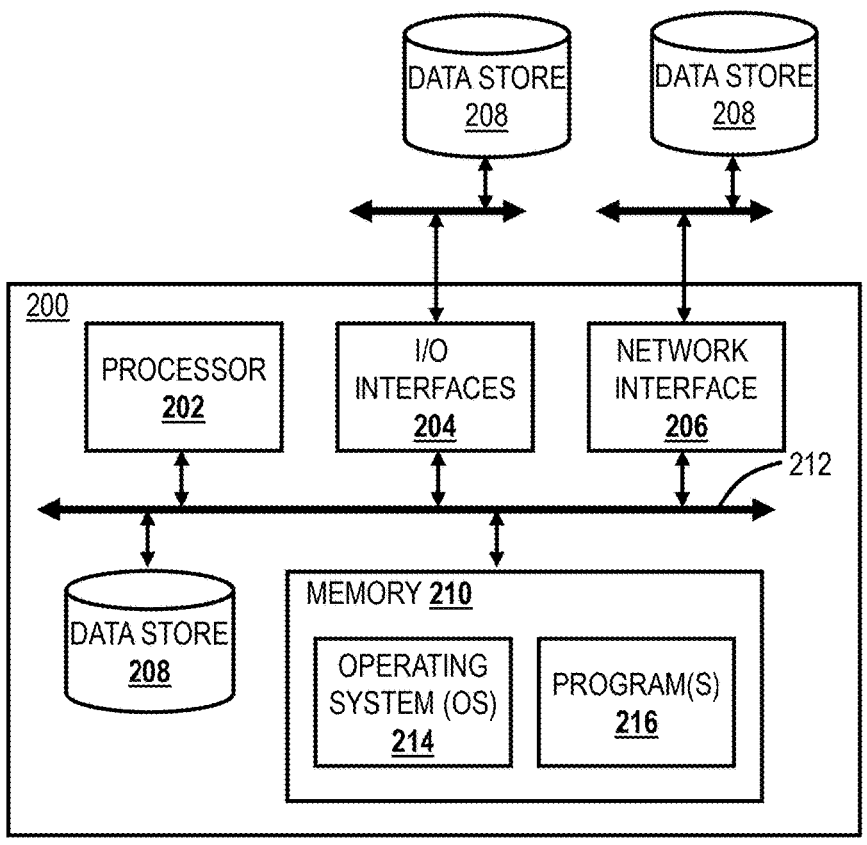
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers

200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface

306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

Digital Experience Monitoring

Figure 6:
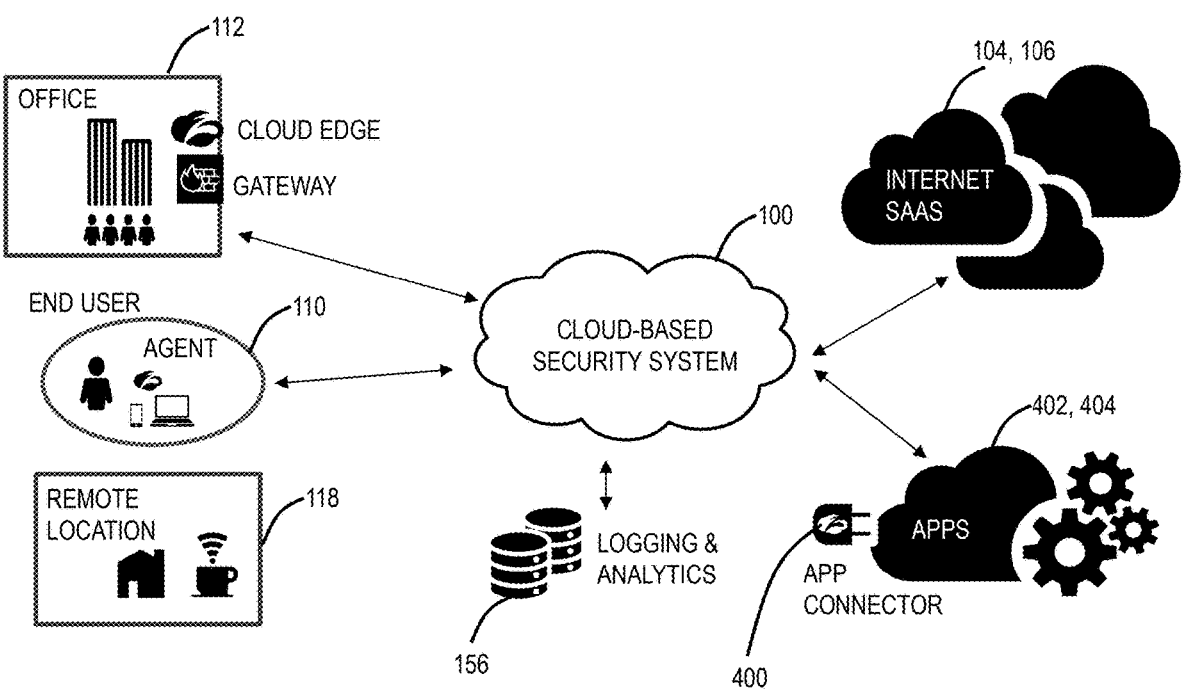
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
| --- | --- |
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
| --- | --- |
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
| --- | --- |
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

User Device Application for Traffic Forwarding and Monitoring

Figure 7:
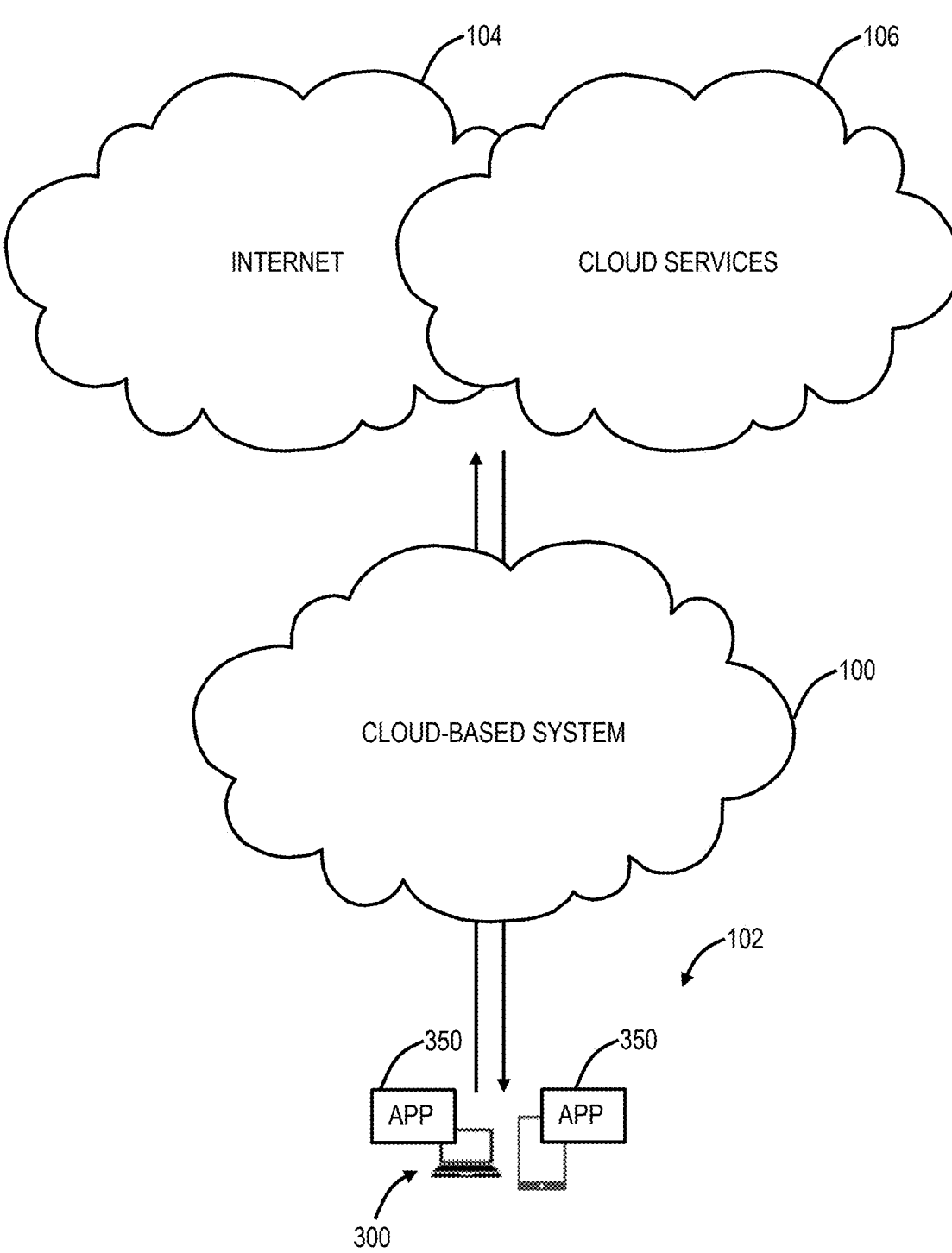
FIG. 7 is a network diagram of the cloud-based system illustrating an application on user devices with users configured to operate through the cloud-based system.

FIG. 7 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system

100. For example, the lightweight tunnel can be HTTP-based. With the application 350, there is no requirement for PAC files, an IPsec VPN, authentication cookies, or user 102 setup.

API Cloud Service Management

The present disclosure provides systems and methods for managing a plurality of cloud services of the cloud-based system vis Application Programming Interfaces (APIs). Again, the present cloud-based system 100 offers various cloud protection services such as access control, threat prevention, data protection, etc. through Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Again, the present cloud-based system 100 is adapted to provide various security services wherein the access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

Currently, customers of the cloud-based system 100 can interact with the various security services by logging into Graphical User Interfaces (GUIs)/User Interfaces (UIs) associated with each of the various security services. These UIs allow administrators to configure the protection provided by each of the services based on their needs. This can be a tedious manual process for new customers and/or established customers needing to perform updated and the like. These customers desire an automated process to be able to configure the various services which they require, to update their service configurations, to perform audits, file compliance reports, and other actions of the like. That is, an automated configuration management system for managing day to day activities, reporting, etc. for the services provided by the cloud-based system is necessary.

In various examples, traditionally, to automate such a management system, the various services provided by the cloud-based system 100 must publish a large number of APIs. Each of the services provided by the cloud-based system 100 publishes APIs and interacts with customers and partners in different ways. That is, the security services do their own thing when it comes to authentication, identifying which customer is making a call, what actions should be performed, when to allow or block certain traffic, etc. These characteristics add complexity over multiple levels in terms of how the cloud-based system 100 publishes APIs and how the cloud-based system 100 allows customers to program its services. Further, customers must learn how each of the services work before they can begin to automate tasks which creates overhead for configurating a service. These challenges arise due to the services provided by the cloud-based system 100 each having their own level of APIs for managing the service, each evolving independently of one another, and each being managed independently. Further, when customers wish to provide a service configuration, for example, via a mapped configuration, when no official public APIs are available, the customers resort to unauthorized libraries. These unauthorized libraries can be available publicly, or developed privately by customers by reverse engineering legitimate admin portal behavior.

The present systems and methods for managing a plurality of cloud services of the cloud-based system provide standardized platform programmability, and reduces operational overhead for customers, partners, and internally to providers of the cloud-bases system 100. Further, the service management system described herein is resilient with a dedicated and secure common API platform, and allows the cloud-based system 100 to offer add-on value driven integrations/services. Such a system is extremely desirable for customers due to the increasing adoption of security automation including administrative duties. The system can also allow easier integration of new products/services of the cloud-based system 100.

Figure 8:
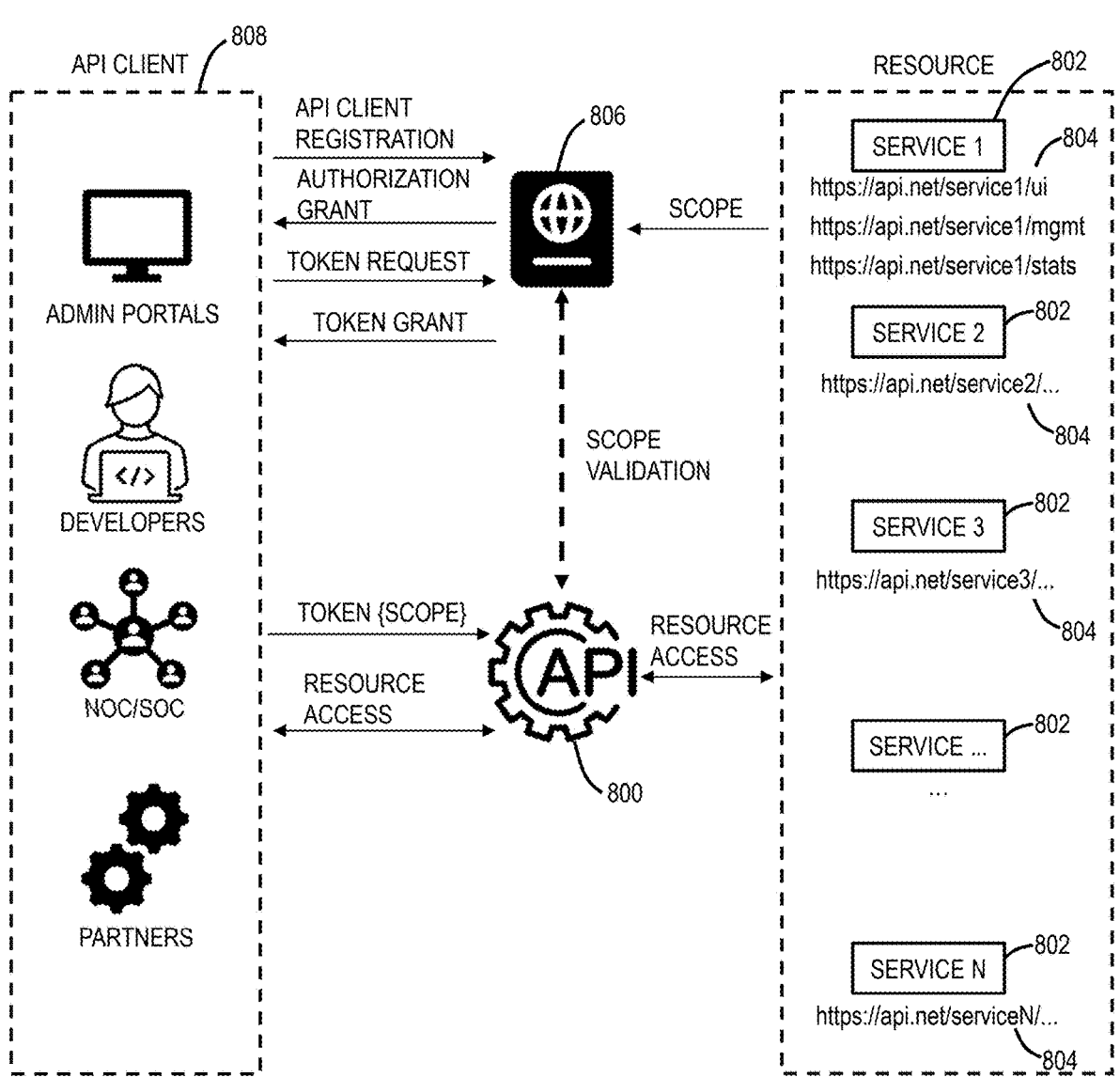
FIG. 8 is a flow diagram of client-resource interactions utilizing the present cloud service management systems.

FIG. 8 is a flow diagram of client-resource interactions utilizing the present cloud service management systems. Again, cloud services 802 such as Service 1-Service N as shown in FIG. 8 can publish individual APIs 804. Again, the services 802 shown in FIG. 8 can be any of ZIA, ZPA, experience monitoring, web services, Cloud Security Posture Management (CSPM), Cloud Infrastructure Entitlement Management (CIEM), and any other cloud security or non-security service described herein or known to one of skill in the art.

Traditionally, anybody can make a call to any of the APIs 804. The present disclosure proposes taking all of the resources and placing them behind a common API proxy 800. This common API proxy 800 can be contemplated as a gateway that is adapted to control who can communicate with which resources behind the cloud-based system 100, and automatically route requests to services. In various embodiments, in order to provide such a common model, a common authorization module 806 is required. That is, instead of anybody directly making a call, they first have to authenticate (login) via the cloud-based system 100 and work with a common authorization module 806. Thus, the present systems offer the common authorization module 806, and the common API proxy 800.

The common authorization model 806 allows specific clients to be mapped with specific scopes. For example, one can register a client to only interact with one or more services 802 of the cloud-based system 100. Thus, the client should not be able to communicate with other services 802 not specified. Similarly, one can register a client to only be able to perform one or more actions. These actions can then be automatically mapped to services with which they are associated. An example of a scope for a registered client 808 can, for example, specify that a client 808, associated with a company, is allowed to make DLP policy changes. This can be contemplated as issuing a token to the client which allows it to perform DLP policy changes, or any other action associated with any other service 802 based on its scope. This token can then be presented to the API proxy 800 by the client with a request. Based on this, when traffic traverses the present systems, the identity of the client 808 is captured and mapped to with the correct scope based on the provided token. Based on this, the systems know which services 802 the client 808 is allowed to interact with because DLP policy changes are associated with specific services 802.

The token is provided to the client 808 by the common authorization module 806. Again, the token is mapped to the client's scope which defines what the client can do in association with the various services 802.

Once the common authorization module 806 is in place, the systems can make sure that all requests are directed to the right resources and to the correct services 802. For example, when a request lands at the API proxy 800, the API proxy 800 performs a scope validation with the common authorization module 806. The client can present any tokens to the API proxy 800 along with any requests, such as a request to make policy changes. The API proxy 800 is adapted to communicate with the common authorization module 806 in order to determine if the client is allowed to perform such actions. Based on the token and the requested action, the common authorization module 806 can instruct the API proxy 800 as to whether the client is allowed or not allowed to perform the requested action.

In an example, the client registers with the common authorization module 806, and is given permission to make DLP policy changes. That is, the client's scope is it has the ability to make DLP policy changes. A token is created which is mapped to the client's scope. This token is provided to the client. The client can then present the token which is mapped to its scope to the common API proxy 800 with any request. The systems will allow the client to make policy changes within services that are associated with DLP. If the client requests to perform an action to a service 802 which does not align with its token, i.e., if the client requests to make non-DLP policy changes, the API proxy 800 is instructed by the common authorization module 806 to decline the request because the requested action is not within the clients scope. The API proxy 800 can then decline the client from making such a request. Thus, it can be contemplated that issuance of association happens at the common authorization module 806, and enforcement happens at the API proxy 800.

In various embodiments, in addition to inspecting the token and identity of the client for determining if a client is allowed to perform an action, the systems can also consider a location of the client originating the request, and various permitted and restricted hours. Policy for enforcing such geo-location restrictions and permitted and restricted hours can be configured in and enforced by the common authorization module 806 and/or the API proxy 800, wherein enforcement occurs at the API proxy 800.

Further, when a client is allowed to perform the requested action, the API proxy 800 is adapted to automatically determine which services the request should be sent to. For example, if the request is to perform DLP policy changes, and the client is allowed to do so, the API proxy 800 will determine which services are associated with DLP policy, and the request will be routed to these services. In this way, customers are not required to manually interact with a plurality of services and a plurality of different UIs in order to make changes.

When a request from a client is allowed by the API proxy 800, the API proxy 800 is adapted to route the request to the correct resource and service 802 which routes to the correct API 804. The response is then routed back to the client 808 by the API proxy 800. By utilizing the present systems, users are not required to interact with a plurality of different services 802 in order to make changes. For example, a call to make DLP policy changes will automatically be sent to every service 802 associated with DLP policy by the API proxy 800. Thus, users do not need to interact with any individual service 802 UIs. Again, the services 802 can be any cloud security service, non-security service, and the like.

Not only are the present systems adapted to automate service changes, but the systems are also adapted to configure a customer's entire environment based on customer configurations. That is, a customer's configuration can be provided to the API proxy 800, and the API proxy 800 can implement all service configurations to the correct services based thereon automatically. In an exemplary use case, the present systems can be utilized to configure a plurality of customer environments automatically based on a baseline configuration. Traditionally, customers, service providers, managed service partners, etc. would have to configure each cloud service individually, taking hundreds of man hours to perform. With the present systems, this can be done via a baseline configuration provided to the API proxy 800 which routes configurations to the correct services automatically.

In various embodiments, the API proxy 800 is adapted to observe traffic in order to detect suspicious characteristics such as extremely high volume of requests. In such cases, the API proxy 800 is further adapted to enforce rate limiting, and the like. Thus, the API proxy 800 also acts as a layer of security where it detects abnormal behavior such as high call volumes, call volumes during certain time windows, quotas applicable to customers, data auditing, etc. The data auditing can include making a log of every transaction and persisting it to provide for further analysis.

In one use case, each API operation has a cost associated with it. That is, an X number of CPU cycles and Y many units of data exchange. For example, API "GET all configured rules under DLP" can cost 10 of X and 10 of Y. In another example, API "POST new rule at specific rule number under DLP" can cost 15 of X and 15 of Y. Every customer can be entitled to default quota, for example, 50 X and 50 Y. After making the above mentioned GET+PUT call, the customer is only left with 25 X and 25 Y. In an embodiment, once a customer hits their quota, only mission-critical API calls will be served for a given time period. Customers can increase their quota if deemed necessary to support their business processes. In an example of this use case, if a customer wants to move from beta to a production setup and must transfer all configurations, it may result in a large volume of calls for a limited period. This can be handled by temporarily increasing a customer's quota.

Further, in various embodiments, the API proxy 800 can be accessed by Network Operations Center (NOC) and Security Operations Center (SOC) personnel to determine endpoint statistics. The API proxy 800 can provide statistics of the customers endpoints for personnel to make determinations such as why high volume is seen, are components scaling, determine maximum hit rates of endpoints, what endpoints can be retired, where is additional capacity needed, etc. Thus, NOC and SOC personnel can go through the API proxy 800 and query statistics on any of their resources to uncover security and scalability infrastructure concerns.

The API Proxy 800 can be distributed globally across multiple datacenters in multiple geographic regions, and proxy requests to the plurality of services. The plurality of services are also distributed globally. Services may be control services or data plane services whereby data sovereignty is required, e.g. for General Data Protection Regulation (GDPR). A client may be controlled to utilize a subset of API Proxies within a region, which will forward to the subset of services within that region. This ensures sovereignty of the data through the data path.

Transactions through the API Proxy 800 may result in higher processing on the targeted service. For example, a PUT operation to update a URL category is low cost. A GET operation for "Top 100 transactions across all users in all geographies" is a high cost operation. The system will assign a cost, as described herein, to each operation, record the cost, and return the cost to the client as part of the transaction. The result is to monitor the cost of compute for API calls and drive efficiency into the system and the calls made by clients.

Process for API Cloud Service Management

FIG. 9 is a flow chart of a process 850 for API cloud service management. The process 850 includes receiving a request from a client associated with a cloud-based system, wherein the request is to perform one or more actions associated with the cloud-based system (step 852); determining if the client is allowed to perform the one or more actions based on a scope associated with the client (step 854); and routing the request to one or more services of the cloud-based system based on the determining (step 856).

The process 850 can further include automatically determining the one or more services of the cloud-based system associated with the request; and routing the request to the one or more services of the cloud-based system based thereon. The scope can indicate one or more actions which the client is allowed to perform on one or more services of the cloud-based system. The steps can further include registering the client to define the scope; and providing the client with a token, wherein the token is mapped to, and identifies the scope of the client. The steps can further include receiving the token with the request from the client; and determining, based on an identity of the client and the token, if the client is allowed to perform the one or more actions. Registering the client and providing the token can be performed at a common authorization module, and the routing can be performed at an API proxy, wherein the common authorization module and the API proxy are communicatively coupled. The API proxy can be adapted to, based on receiving a request with a token, consult the common authorization module for the determining. The request can be blocked based on the scope associated with the client.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

receiving, at a common Application Programming Interface (API) proxy, a request from a client associated with a cloud-based system, wherein the request is to perform one or more actions associated with the cloud-based system and includes a token presented by the client;

determining if the client is allowed to perform the one or more actions based on a scope associated with the client by transmitting, from the common API proxy to a common authorization module communicatively coupled to the common API proxy, a scope-validation query including an identity of the client, the token, and the requested one or more actions, wherein the common authorization module maintains a mapping of registered clients to corresponding scopes, and receiving from the common authorization module an authorization decision indicating whether the token identifies a scope permitting the one or more actions; and routing the request to one or more services of the cloud-based system based on the determining when the authorization decision indicates the client is allowed, including automatically determining, by the common API proxy, the one or more services of the cloud-based system associated with the request, and otherwise blocking the request at the common API proxy when the authorization decision indicates the client is not allowed.

2. The method of claim 1, wherein the scope indicates one or more actions which the client is allowed to perform on one or more services of the cloud-based system, the scope being identified by the token and enforced based on the authorization decision from the common authorization module.

3. The method of claim 1, wherein the steps further comprise:

automatically determining, by the common API proxy, the one or more services of the cloud-based system associated with the request; and routing the request to the one or more services of the cloud-based system based thereon when the authorization decision indicates the client is allowed to perform the one or more actions.

4. The method of claim 1, wherein the steps further comprise:

registering the client with the common authorization module to define the scope; and providing the client with a token, wherein the token is mapped to, and identifies the scope of the client maintained by the common authorization module.

5. The method of claim 4, wherein the steps further comprise:

receiving the token with the request from the client at the common API proxy; and determining, based on an identity of the client and the token, if the client is allowed to perform the one or more actions by obtaining the authorization decision from the common authorization module.

6. The method of claim 5, wherein registering the client and providing the token is performed at a common authorization module, and the routing is performed at the common API proxy, and wherein the common authorization module and the common API proxy are communicatively coupled.

7. The method of claim 6, wherein the common API proxy is adapted to, based on receiving a request with a token, consult the common authorization module via the scope-validation query for the determining.

8. The method of claim 1, wherein the request is blocked based on the scope associated with the client when the authorization decision indicates the client is not allowed to perform the one or more actions.

9. A non-transitory computer-readable medium comprising instructions that, when executed, cause one or more processors to perform steps of:

receiving, at a common Application Programming Interface (API) proxy, a request from a client associated with a cloud-based system, wherein the request is to perform one or more actions associated with the cloud-based system and includes a token presented by the client;

determining if the client is allowed to perform the one or more actions based on a scope associated with the client by transmitting, from the common API proxy to a common authorization module communicatively coupled to the common API proxy, a scope-validation query including an identity of the client, the token, and the requested one or more actions, wherein the common authorization module maintains a mapping of registered clients to corresponding scopes, and receiving from the common authorization module an authorization decision indicating whether the token identifies a scope permitting the one or more actions; and routing the request to one or more services of the cloud-based system based on the determining when the authorization decision indicates the client is allowed, including automatically determining, by the common API proxy, the one or more services of the cloud-based system associated with the request, and otherwise blocking the request at the common API proxy when the authorization decision indicates the client is not allowed.

10. The non-transitory computer-readable medium of claim 9, wherein the scope indicates one or more actions which the client is allowed to perform on one or more services of the cloud-based system, the scope being identified by the token and enforced based on the authorization decision from the common authorization module.

11. The non-transitory computer-readable medium of claim 9, wherein the steps further comprise:

automatically determining, by the common API proxy, the one or more services of the cloud-based system associated with the request; and routing the request to the one or more services of the cloud-based system based thereon when the authorization decision indicates the client is allowed to perform the one or more actions.

12. The non-transitory computer-readable medium of claim 9, wherein the steps further comprise:

registering the client with the common authorization module to define the scope; and providing the client with a token, wherein the token is mapped to, and identifies the scope of the client maintained by the common authorization module.

13. The non-transitory computer-readable medium of claim 12, wherein the steps further comprise:

receiving the token with the request from the client at the common API proxy; and determining, based on an identity of the client and the token, if the client is allowed to perform the one or more actions by obtaining the authorization decision from the common authorization module.

14. The non-transitory computer-readable medium of claim 13, wherein registering the client and providing the token is performed at a common authorization module, and the routing is performed at the common API proxy, and wherein the common authorization module and the common API proxy are communicatively coupled.

15. The non-transitory computer-readable medium of claim 14, wherein the common API proxy is adapted to, based on receiving a request with a token, consult the common authorization module via the scope-validation query for the determining.

16. The non-transitory computer-readable medium of claim 9, wherein the request is blocked based on the scope associated with the client when the authorization decision indicates the client is not allowed to perform the one or more actions.

17. A cloud-based system comprising:

one or more processors and memory storing instructions that, when executed, cause the one or more processors to:

receive, at a common Application Programming Interface (API) proxy, a request from a client associated with the cloud-based system, wherein the request is to perform one or more actions associated with the cloud-based system and includes a token presented by the client;

determine if the client is allowed to perform the one or more actions based on a scope associated with the client by transmitting, from the common API proxy to a common authorization module communicatively coupled to the common API proxy, a scope-validation query including an identity of the client, the token, and the requested one or more actions, wherein the common authorization module maintains a mapping of registered clients to corresponding scopes, and receiving from the common authorization module an authorization decision indicating whether the token identifies a scope permitting the one or more actions; and route the request to one or more services of the cloud-based system based on the determining when the authorization decision indicates the client is allowed, including automatically determining, by the common API proxy, the one or more services of the cloud-based system associated with the request, and otherwise blocking the request at the common API proxy when the authorization decision indicates the client is not allowed.

18. The cloud-based system of claim 17, wherein the scope indicates one or more actions which the client is allowed to perform on one or more services of the cloud-based system, the scope being identified by the token and enforced based on the authorization decision from the common authorization module.

19. The cloud-based system of claim 17, wherein the instructions, when executed, further cause the one or more processors to:

automatically determine, by the common API proxy, the one or more services of the cloud-based system associated with the request; and route the request to the one or more services of the cloud-based system based thereon when the authorization decision indicates the client is allowed to perform the one or more actions.

20. The cloud-based system of claim 17, wherein the instructions, when executed, further cause the one or more processors to:

provide the client with a token, wherein the token is mapped to, and identifies the scope of the client maintained by the common authorization module;

receive a request from a client at the common API proxy, wherein the request includes the token; and determine, based on the token, if the client is allowed to perform one or more actions associated with the request by obtaining the authorization decision from the common authorization module.

\* \* \* \* \*